US005417137A

United States Patent [19]

Krasny et al.

[11] Patent Number: 5,417,137

[45] Date of Patent: May 23, 1995

[54] METRONOME APPARATUS

[76] Inventors: G. Mitchell Krasny, 787 Malibu La., Indiatlantic, Fla. 32903; Evgeny G. Tibilov, Serebristy, St. Petersburg, Bulvar, Russian Federation, 5/1 KV 174

[21] Appl. No.: 296,905

[22] Filed: Aug. 29, 1994

[51] Int. Cl.[6] .............. G09B 15/00

[52] U.S. Cl. .............. 84/484; 84/454; 340/815.45; 340/815.69

[58] Field of Search .............. 84/454, 464 R, 484; 340/384 E

[56] References Cited

U.S. PATENT DOCUMENTS

| | | | |
|---|---|---|---|
| 3,540,344 | 11/1970 | Veech | 84/484 |
| 4,014,167 | 3/1977 | Hasegawa et al. | 84/454 X |
| 4,193,257 | 3/1980 | Watkins | 84/484 |
| 4,204,400 | 5/1980 | Morohoshi et al. | 84/484 |
| 4,232,582 | 11/1980 | Diamond | 84/267 |
| 4,321,853 | 3/1982 | Tumblin | 84/454 |
| 4,602,551 | 7/1986 | Firmani et al. | 84/484 |
| 4,982,642 | 1/1991 | Nishikawa et al. | 84/484 |
| 5,214,228 | 5/1993 | Hoiles et al. | 84/484 X |

FOREIGN PATENT DOCUMENTS

| | | |
|---|---|---|
| 2472772 | 7/1981 | France . |
| 1-114787 | 5/1989 | Japan . |

*Primary Examiner*—Michael L. Gellner
*Assistant Examiner*—Patrick J. Stanzione
*Attorney, Agent, or Firm*—Edward M. Livingston

[57] ABSTRACT

A metronome apparatus has an electro-mechanical rhythm generator (28) in sound communication of a variable targeted optimum rhythm to a first (4) of two earphones (4,5) of a dual-earphone headset (2). In sound communication with a second (5) of the two earphones (4,5) is a manual rhythm generator (27). The manual rhythm generator (27) has preferably four adjustable finger buttons (8,9,10,11) that are operable by four fingers of a user's hand. Rhythm generated by the manual rhythm generator (27) and the targeted optimum rhythm of the electro-mechanical rhythm generator (28) are comparable in opposite earphones of the headset positioned on a user. Sound differences indicate nearness to correct rhythm. Light intensity of a light signal (35) is optional to indicate relative correctness of rhythm for increased precision of rhythm accuracy. Variations of rhythm also can be compared similarly. Independently of any instrument, the manual rhythm generator (27) with four finger buttons (8,9,10,11) can be used to practice rhythm. This metronome apparatus may be played with any instrument. The apparatus even has applications in physical therapy, dance, sports and industrial control and monitoring. Electrical circuitry is provided.

26 Claims, 3 Drawing Sheets

FIG. 3
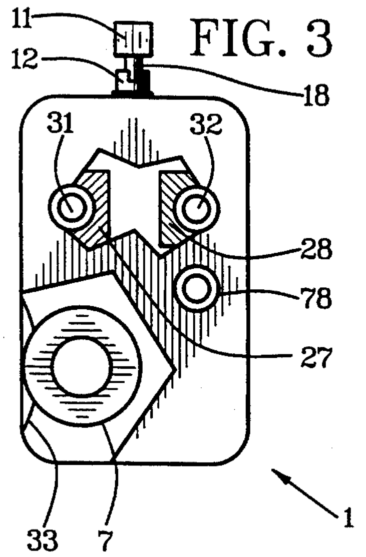
FIG. 4
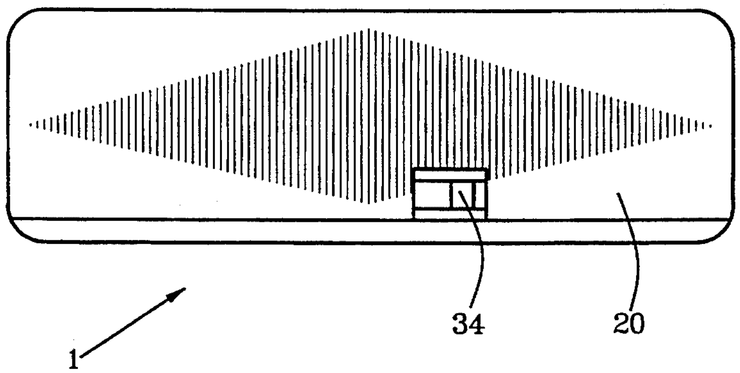
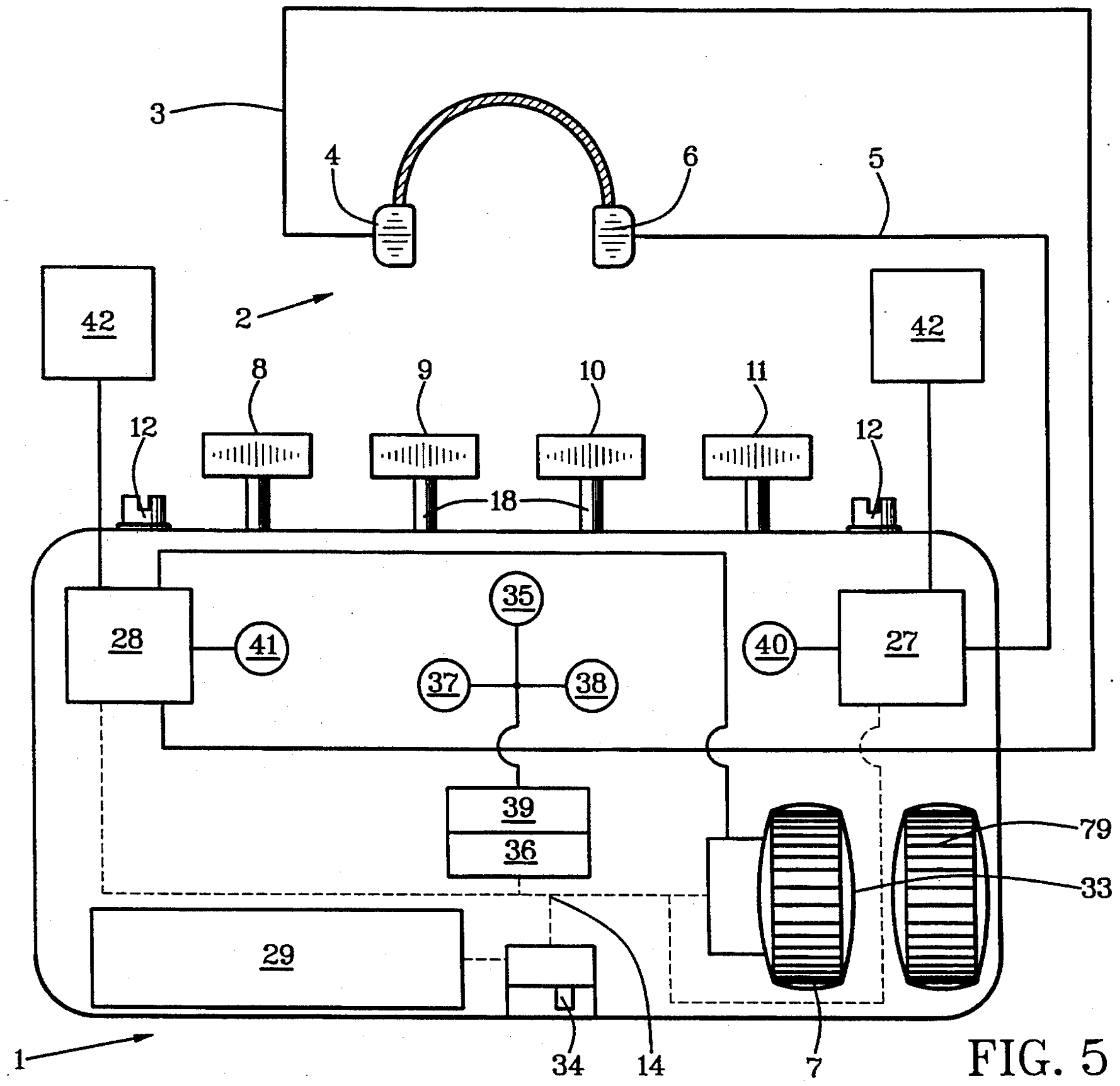
FIG. 5

3/3

METRONOME APPARATUS

BACKGROUND OF THE INVENTION

This invention relates to musical metronomes and in particular to a metronome having optimum rhythm conveyed to a first earphone and exercise rhythm from a four-finger rhythm generator conveyed to a second earphone for comparison of rhythm generated with the optimum rhythm.

Previous metronomes have included a wide variety of rhythm generators. The most basic are ticking devices that tick out a rhythm. These are fine for music that does not require a high precision of rhythm. For high precision of professional music, however, mere ticks of rhythm are not detectable with sufficient precision. As a result, electronic metronomes have been devised for particular types of music and use conditions. None, however, have provided the dual-earphone comparison of target rhythm with practice rhythm and other features of this invention.

Examples of different metronomes in prior art include U.S. Pat. No. 4,982,642 granted to Nishikawa et al. The Nishikawa patent employs difference of main sound from tune sound. Japanese Patent 1-114787 granted to Mitsuharu samples and compares external beat with optimum beat independently of participation by a user. U.S. Pat. No. 4,602,551 granted to Firmani et al. provides both audible and visual indicators of proper beat but not by comparison in earphones. U.S. Pat. No. 4,321,853 granted to Tumblin teaches use of lights to indicate sharp, flat or correct pitch of a plurality of tone generators of musical instruments under control of one microprocessor. U.S. Pat. No. 4,232,582 granted to Diamond describes a means for isolating individual musicians in a group whose instruments are being played out of "sync". U.S. Pat. No. 4,204,400 granted to Morohoshi et al. teaches an electronic metronome that generates upbeat and downbeat signals that yield audible and visual signals to a musician. Finally, U.S. Pat. No. 4,193,257 granted to Watkins teaches a programmable metronome which produces audible and visual indicators of a beat which may be varied.

SUMMARY OF THE INVENTION

In light of the problems that have existed and that continue to exist in this field, objectives of this invention are to provide a metronome which:

Provides comparison of a musician's instrument-playing rhythm in a first earphone with a targeted optimum rhythm in a second earphone;

Provides practice and exercise rhythm generated with a four-finger rhythm generator to targeted optimum rhythm in separate earphones of a single headset of earphones independently of a musical instrument;

Provides light-intensity indication of variation of practice and exercise rhythm from targeted optimum rhythm;

Provides a separate tone for high-precision conformance of practice and exercise rhythm to targeted optimum rhythm;

Provides variation of finger-button touch of the four-finger rhythm generator; and Provides variation of targeted optimum rhythm with a convenient tempo control knob.

This invention accomplishes the above and other objectives with a metronome having an electro-mechanical rhythm generator in sound communication of a variable targeted optimum rhythm to a first of two earphones of a dual-earphone headset. In sound communication with a second of the two earphones is a manual rhythm generator. The manual rhythm generator has preferably four adjustable finger buttons that are operable by four fingers of a user's hand. Rhythm generated by the manual rhythm generator and the targeted optimum rhythm of the electro-mechanical rhythm generator are comparable in opposite earphones of the headset positioned on a user. Special tones for slow, fast and correct rhythm and sound intensity to indicate nearness to correct rhythm can be provided. Light intensity of a light signal is optional to indicate relative correctness of rhythm for increased precision of rhythm accuracy. Swing variations of rhythm also can be compared similarly. Independently of any instrument as an option, the manual rhythm generator with four finger buttons can be used to practice rhythm. Electrical circuitry is provided.

BRIEF DESCRIPTION OF THE DRAWINGS

This invention is described by appended claims in relation to description of a preferred embodiment with reference to the following drawings which are described briefly as follows:

FIG. 3 is a partial cutaway end view of a rhythm generator in partial schematic form;

FIG. 4 is a bottom view of a rhythm generator;

FIG. 5 is a layout schematic; and

DESCRIPTION OF PREFERRED EMBODIMENT

Figure 1:
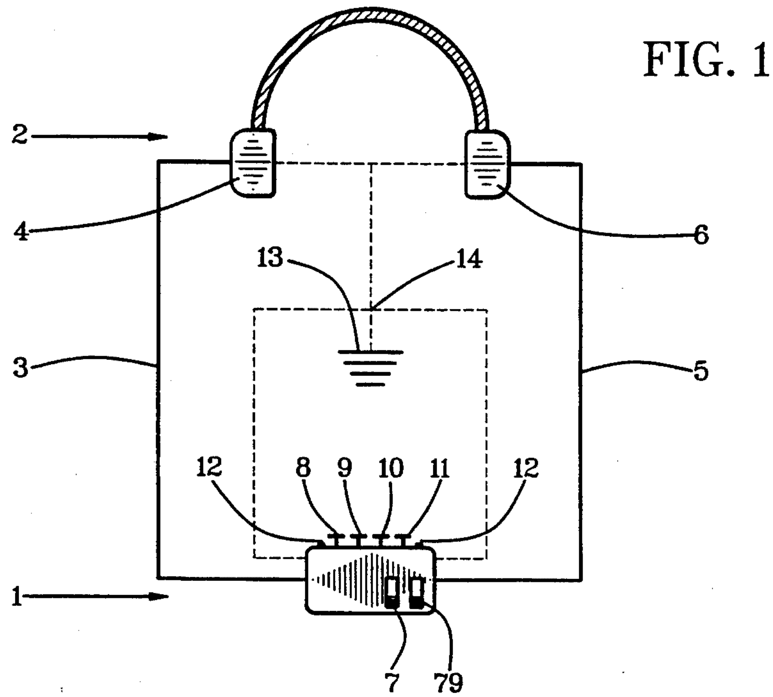
FIG. 1 is a plan view of a rhythm generator in relationship to an earphone headset.

Reference is made first to FIG. 1. A rhythm generator 1 transmits targeted optimum rhythm and manual rhythm to a headset 2 for exercise practice in comparing the manual rhythm to the targeted optimum rhythm. A first earphone line 3 transmits the targeted optimum rhythm to a first earphone 4 of the headset 2 and a second earphone line 5 transmits the manual rhythm to the second earphone 6 of the headset 2. The targeted electronic optimal rhythm is variable by a tempo control knob 7. Delay between the generated rhythm and a person's natural response is accounted for by using an advance control 79. The manual rhythm is generated manually by pushing at least one or preferably one of four finger buttons consisting of a first finger button 8, a second finger button 9, a third finger button 10 and a fourth finger button 11. Touch of the finger buttons is adjustable with adjustment screws 12. An electrical power source 13 provides electrical power through electrical lines 14 as appropriate to all components requiring electrical current.

Figure 2:
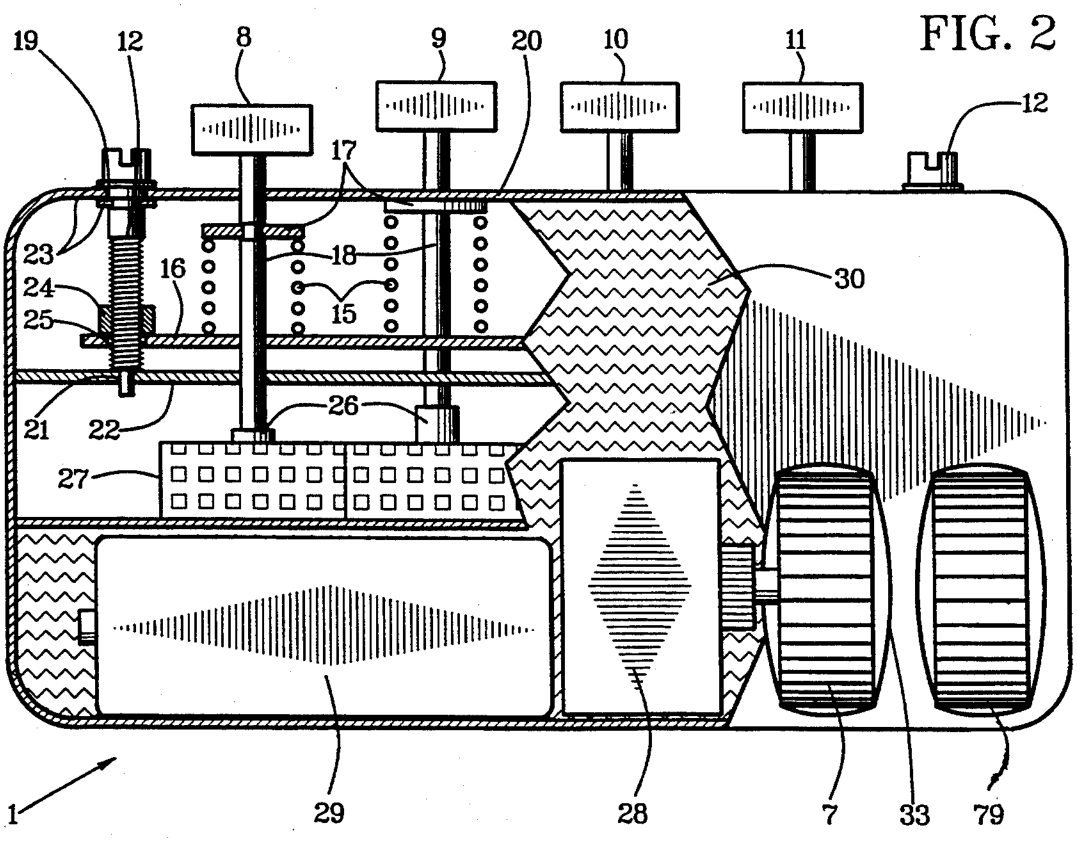
FIG. 2 is a partial cutaway side view of a rhythm generator.
Figure 6:
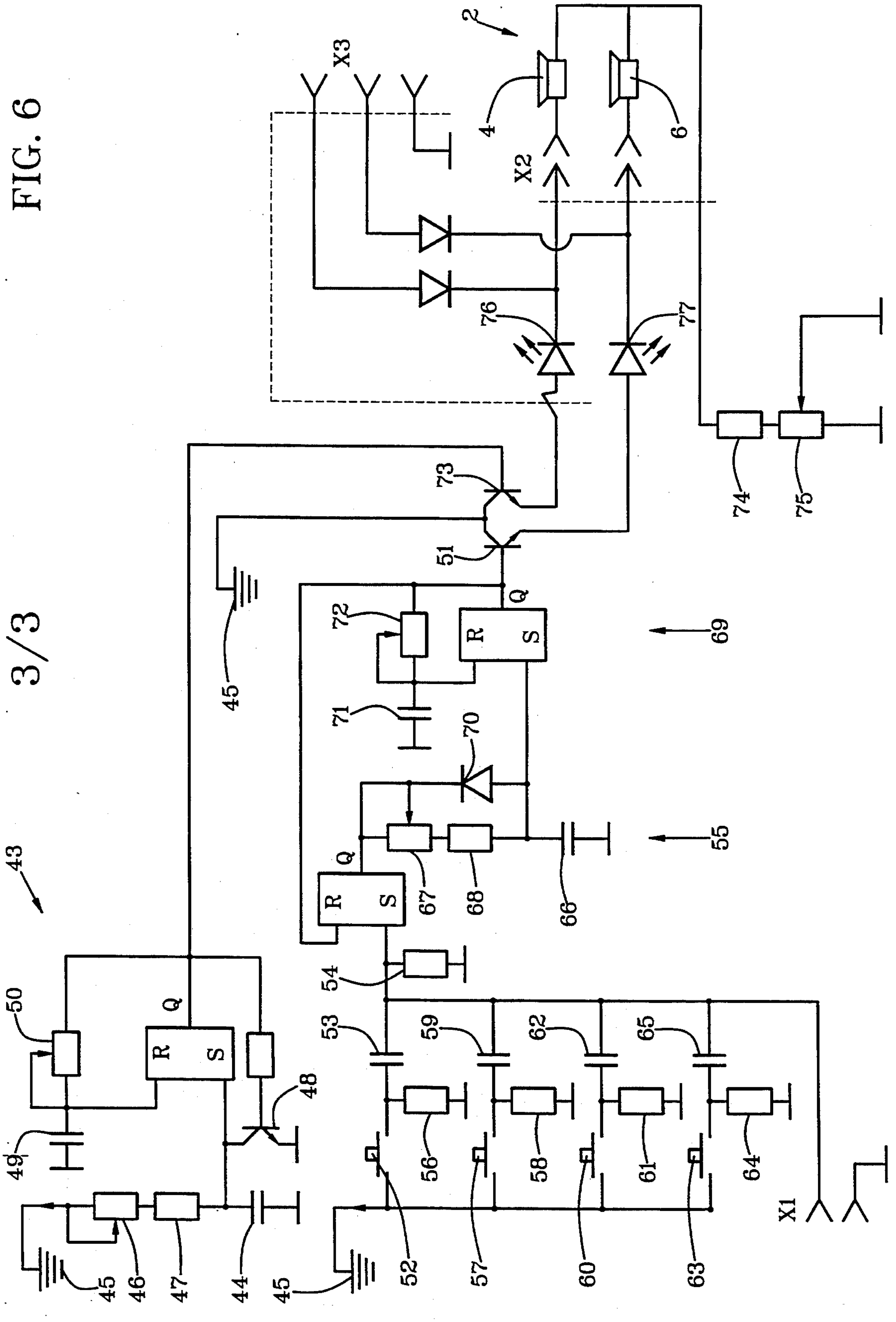
FIG. 6 is a circuit diagram of the basic components.

Referring to FIG. 2, free length of button springs 15 between an adjustment base 16 and shaft attachments 17 on button shafts 18 of the finger buttons 8–11 is variable by rotating one or both adjustment screws 12 clockwise for increase and counterclockwise for decrease. Increase of the free length of button springs 15 lightens touch and decrease of the free length of the button springs 15 stiffens the touch of the finger buttons 8–11 to provide touch adjustment by adjustable resistance to operation. Sections of the adjustment screw 12 without machine threads rotate freely in a housing orifice 19 in a housing wall 20 of the rhythm generator 1 and in a rigid-base orifice 21 in a rigid base 22. Adjustment-screw snap rings 23 on opposite sides of the housing wall 20 of the rhythm generator 1 form a frame base from which free length of button springs 15 is adjustable. An adjustment nut 24 is attached rigidly to the adjustment base 16 which can have an adjustment-base orifice 25 that is concentric with the adjustment nut 24.

Referring to FIGS. 1–2, pushing a finger button 8–11 causes a button shaft 18 to depress a beat plunger 26 which actuates a beat tone from a manual rhythm generator 27 for transmission to the second earphone 6 of the headset 2 described in relation to FIG. 1. Manual rhythm of beat generated by manually pushing either or a plurality of the finger buttons 8–11 and transmitted to the second earphone 6 of the headset 2 is compared to targeted optimum rhythm generated by an electro-mechanical rhythm generator 28 that is regulated by tempo control knob 7 and transmitted to the first earphone 4 of the headset 2. Electrical power can be provided by a battery 29 or other electrical power source 13. Appropriate electrical circuitry can be positioned on a circuit board 30 as desired.

Adjustment of free length of the button springs 15 does not change length of stroke of the finger buttons 8–11. Stroke length is determined by travel length of the beat plunger 26 for inward travel. Outward travel length is determined by contact of the shaft attachments 17 with the housing wall 20.

Referring to FIG. 3, a first input socket 31 for a stereo earphone line 3 and a second input socket 32 for inputting a musical recorder or instrument line 5 can be provided in an end of the rhythm generator 1. A third socket 78 or other sockets may be used as an output to a measuring device, other instrument or a computer. A computer could be used in physical therapy applications to measure a person's ability to keep rhythm, nerve impulses and brain function. The manual rhythm generator 27 and electro-mechanical rhythm generator 28 described in relation to FIG. 2 are represented schematically. The tempo control knob 7 is shown in cutaway with an access indentation 33 having arcuate sides.

Referring to FIGS. 4–5, a power switch 34 can be recessed in a bottom of the housing wall 20. This allows the rhythm generator 1 to be set down or to be handheld without inadvertent movement of the power switch 34.

An electric indicator light 35 can be actuated in light intensity in proportion to time length of variance, of the manual rhythm from the optimum targeted rhythm by a light-intensity regulator 36. A fast electric light 37 and a slow electric light 38 can be employed also to indicate variance ahead for fast and variance behind respectively for fast and slow manual rhythm in comparison to optimum targeted rhythm. Either or all of lights 35, 37 and 38 can be light-emitting diodes (LEDs). Color of light can be employed instead of intensity of light with similar controls. Rhythm sound can be transmitted by wire or by radio wave independently of wire communication. A light selector 39 is employed to select which light is to be used for light communication of rhythm variance. An instrument LED 40 and a metronome LED 41 can be connected directly to the manual rhythm generator 27 and the electro-mechanical rhythm generator 28 respectively to indicate variance by light communication independently of the light-intensity regulator 36 and the light selector 39.

A tape recorder 42, other player-recorder, computer or other rhythm generation device, such as electronic drums or other musical instrument, can be connected to the electro-mechanical rhythm generator 28 for optimum targeted rhythm. For instance, when a tape recorder 42 is substituted for electronic generation, the rhythm of the tape recorder 42 is compared to the manual rhythm. When an instrument is substituted for the manual rhythm, instrument rhythm is compared to the electronic rhythm 42.

Referring now to FIGS. 1–6, a DD1.1 trigger assembly 43 has C1 condenser (also known as a capacitor) 44 that is charged from a power source 45 through variable resistor tempo control 46 and R2 resistor 47. In a design period of time of about $t_1 \sim 0.8(R1+R2)C1$, voltage at C1 condenser 44 reaches a level that triggers DD1.1 trigger assembly 43 to close to an active condition. Simultaneously, VT1 transistor 48 opens and quickly charges C1 condenser 44. A C2 condenser 49 is charged through variable resistor 50 with voltage from DD1.1 trigger assembly 43. In a design period of time of about $t_2 \sim 0.8R3.C1$, voltage at C2 condenser 49 reaches a level that triggers DD1.1 trigger assembly 43 which then switches to zero position. At this point, VT1 transistor 48 closes at termination of a cycle. The cycle then repeats. Thus, the DD1.1 trigger assembly 43 generates end impulses of $t_2$ duration at an output end with a duration repeat period of $t_1$. These impulses are amplified by current transmitted through VT2 emitter repeater 51 and played back by the first earphone 4 of the headset 2.

While pressing the first finger button 8 to operate SA1 switch 52, for example, differential chain C3 condenser 53 and R9 resistor 54 provides starting impulse for DD1.2 trigger assembly 55. After releasing the first finger button 8 and SA1 switch 52, C3 condenser 53 discharges current through R5 resistor 56 and R9 resistor 54. The process is analogous for pressing any other finger button 9–11. For instance, if SA3 switch 60 is pressed, starting impulse is formed by C5 condenser 62 and R9 resistor 54. Electrical charge to C5 condenser 62 goes through R7 resistor 61 and R9 resistor 54. Impulses of reverse polarity are cut down by the protective diode in the DD1.1 trigger assembly 43.

After being turned on, the DD1.2 trigger assembly 55 enters an active stage in which C7 condenser 66 charges variable resistor for advance control 67 and R11 resistor 68 from an out lead of the DD1.2 trigger assembly 55. After a design period of time of about $t_3 \sim 0.8(R10+R11).C7$, voltage at C7 condenser 66 reaches a limit point to trigger DD1.3 trigger assembly 69 and switches it to active position. Impulse from DD1.3 trigger assembly 69 adjusts the DD1.2 trigger assembly 55 to zero position while C7 condenser 66 changes quickly through VD1 diode 70. Simultaneously, C8 condenser 71 initiates electrical charge through variable resistor 72. After a design period of time of about $t_4 = t_2 \sim 0.8R12.C8$, voltage on C8 condenser 71 reaches a limit point to trigger DD1.3 trigger assembly 69 and switches it to zero.

After pressing any finger button 8–11 to activate switches 52, 57, 60 or 63 with the delay $t_3$ at the output end of DD1.3 trigger assembly 69, there is a manual impulse from the manual rhythm generator 27 that has the same duration as the electro-mechanical impulse from the electro-mechanical rhythm generator 28. This impulse from the manual rhythm generator 27 is augmented by current through VT3 resistor 73 and played back in the second earphone 6. Volume is adjusted by variable resistor for volume control 75. Variable resistor tempo control 46 regulates slower or higher beats of the electro-mechanical rhythm generator 28 ($t_1$). Variable resistor for advance control 67 controls time of delay ($t_3$). A new and useful metronome apparatus having been described, all such modifications, adaptations, substitutions of equivalents, combinations of parts, applications and forms thereof as described by the following claims are included in this invention.

I claim:

1. A metronome apparatus comprising:
an electro-mechanical rhythm generator;
a manual rhythm generator;
a headset having a first earphone and a second earphone;
a first sound conveyance in sound communication between the electro-mechanical rhythm generator and the first earphone of the headset;
a second sound conveyance in sound communication between the manual rhythm generator and the second earphone of the headset; and
electrical circuitry in communication between a source of electrical power and electrically operative components of the metronome apparatus.

2. A metronome apparatus as described in claim 1 wherein:
the electro-mechanical rhythm generator is variable in rhythm.

3. A metronome apparatus as described in claim 1 and further comprising:
a control knob with which the electro-mechanical rhythm generator is variable in rhythm.

4. A metronome apparatus as described in claim 1 wherein:
the manual rhythm generator has at least one finger button with which rhythm can be generated for communication to the second earphone of the headset.

5. A metronome apparatus as described in claim 4 wherein:
the finger button is adjustable in resistance to operation.

6. A metronome apparatus as described in claim 4 and further comprising:
a button spring positioned intermediate a base on the manual rhythm generator and an attachment on a shaft of the finger button; and
the base on the manual rhythm generator is variable in distance from the attachment on the shaft of the finger button, such that the finger button is adjustable in resistance to operation of the finger button by means of adjustment of distance of the base on the manual rhythm generator from the attachment on the shaft of the finger button.

7. A metronome apparatus as described in claim 6 and further comprising:
a button spring positioned intermediate at least one base on the manual rhythm generator and attachments on shafts of the finger buttons; and
the base on the manual rhythm generator is variable in distance from the attachments on the shafts of the finger buttons, such that the finger buttons are adjustable in resistance to operation of the finger buttons by means of adjustment of distance of the base on the manual rhythm generator from the attachments on the shafts of the finger buttons.

8. A metronome apparatus as described in claim 1 wherein:
the manual rhythm generator has four finger buttons with which rhythm can be generated for communication to the second earphone of the headset.

9. A metronome apparatus as described in claim 1 wherein:
the electro-mechanical rhythm generator is a generator of sounds representative of targeted rhythmic beats.

10. A metronome apparatus as described in claim 9 wherein:
the manual rhythm generator is a generator of sounds representative of beats of a musical-beat source.

11. A metronome apparatus as described in claim 10 wherein:
the electro-mechanical rhythm generator is a generator of progressively different intensity of sound in proportion to variation from on-beat correctness of rhythm generated with the manual rhythm generator.

12. A metronome apparatus as described in claim 10 wherein:
the electro-mechanical rhythm generator is a generator of a selectively different sound for on-beat rhythm of the manual rhythm generator.

13. A metronome apparatus as described in claim 10 and further comprising:
an electric indicator light;
a light-intensity regulator in communication between the electro-mechanical rhythm generator and the manual rhythm generator; and
the electric indicator light being variable in intensity by the light-intensity regulator in proportion to variation from on-beat correctness of rhythm generated with the manual rhythm generator.

14. A metronome apparatus as described in claim 13 wherein:
the electric indicator light is regulated by the light-intensity regulator to emit a different color when the rhythm generated with the manual rhythm generator is slower than when the rhythm generated by the manual rhythm generator is faster than rhythm generated by the electro-mechanical rhythm generator.

15. A metronome apparatus as described in claim 10 and further comprising:
a fast electric indicator light;
a slow electric indicator light;
a light selector in light-selection relationship between the fast electric indicator light and the slow electric indicator light in accordance with relative speed of rhythm of the manual rhythm generator and the electro-mechanical rhythm generator;
a light-intensity regulator in communication between the electro-mechanical rhythm generator and the manual rhythm generator; and
the electric indicator light being variable in intensity by the light-intensity regulator in proportion to variation from on-beat correctness of rhythm generated with the manual rhythm generator for whichever of the fast electric indicator light and the slow electric indicator light is activated.

16. A metronome apparatus as described in claim 15 wherein:
the fast electric indicator light and the slow electric indicator light are different colored.

17. A metronome apparatus as described in claim 10 and further comprising:
a metronome light-emitting diode in communication with the electro-mechanical rhythm generator and being provided with electrical current that is regulated to activate the metronome light-emitting diode precisely when beats of rhythm are transmitted from the electro-mechanical rhythm generator to the first earphone of the headset.

18. A metronome apparatus as described in claim 10 and further comprising:
an instrument light-emitting diode in communication with the manual rhythm generator and being provided with electrical current that is regulated to activate the instrument light-emitting diode precisely when beats of rhythm are transmitted from the manual rhythm generator to the second earphone of the headset.

19. A metronome apparatus as described in claim 10 and further comprising:
a metronome light-emitting diode in communication with the electro-mechanical rhythm generator and being provided with electrical current that is regulated to activate the metronome light-emitting diode precisely when beats of rhythm are transmitted from the electro-mechanical rhythm generator to the first earphone of the headset; and
an instrument light-emitting diode in communication with the manual rhythm generator and being provided with electrical current that is regulated to activate the instrument light-emitting diode precisely when beats of rhythm are transmitted from the manual rhythm generator to the second earphone of the headset, such that simultaneous activation of the metronome light-emitting diode and the instrument light-emitting diode indicates conformity of the manual rhythm generator with targeted rhythm of the electro-mechanical rhythm generator.

20. A metronome apparatus as described in claim 1 wherein:
the manual rhythm generator is a generator of sounds representative of beats of a musical-beat source.

21. A metronome apparatus as described in claim 1 and further comprising:
an electric indicator light;
a light-intensity regulator in communication between the electro-mechanical rhythm generator and the manual rhythm generator; and
the electric indicator light being variable in intensity by the light-intensity regulator in proportion to variation from on-beat correctness of rhythm generated with the manual rhythm generator.

22. A metronome apparatus as described in claim 1 wherein:
the electro-mechanical rhythm generator is operated by a record-player device, such that rhythm communicated to the first earphone of the headset is communicated from a recording-and-playing instrument.

23. A metronome apparatus as described in claim 1 wherein:
the electronic rhythm generator is operated by a music source, such that rhythm communicated to the second earphone of the headset for comparison and adjustment with a targeted manual rhythm is communicated from a recording-and-playing instrument.

24. A metronome apparatus as described in claim 1 further comprising:
an electrical output from the metronome apparatus to a measuring device to compare manually generated rhythm to electronically generated rhythm.

25. The metronome apparatus of claim 24 further comprising:
adjustability by resistor means so as to make adjustments for variations between the manually-generated rhythm and the electronically-generated rhythm.

26. The metronome apparatus of claim 1 further comprising:
a control means for advancing a electronically-generated beat ahead of a manually-generated beat to create a swing variation between the two beats to require a user to react earlier to achieve correct rhythm.

* * * * *